M. C. EARNEST.
COOKING STOVE.
APPLICATION FILED DEC. 22, 1910.
1,046,059.
Patented Dec. 3, 1912.
2 SHEETS—SHEET 1.
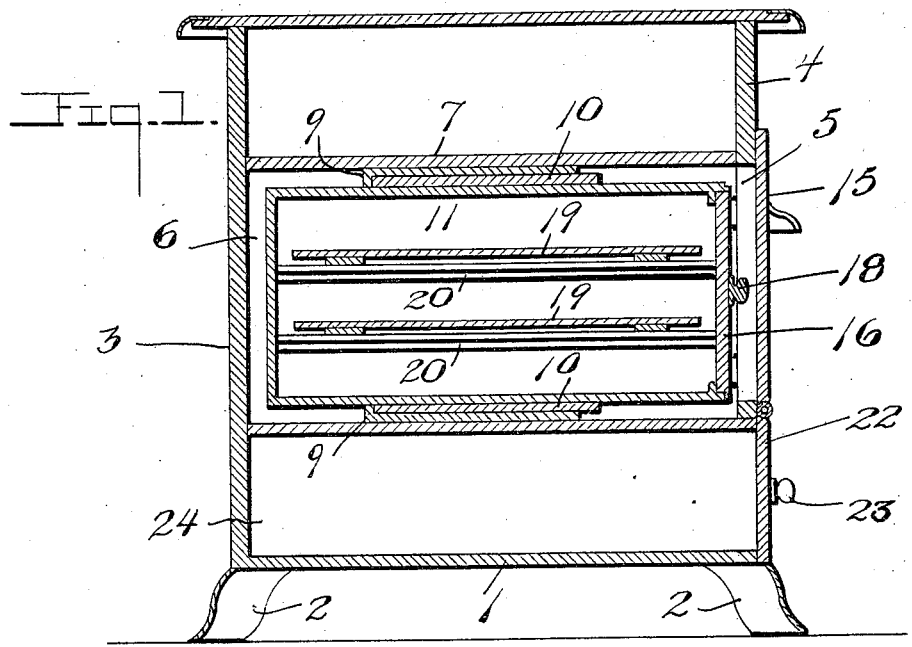
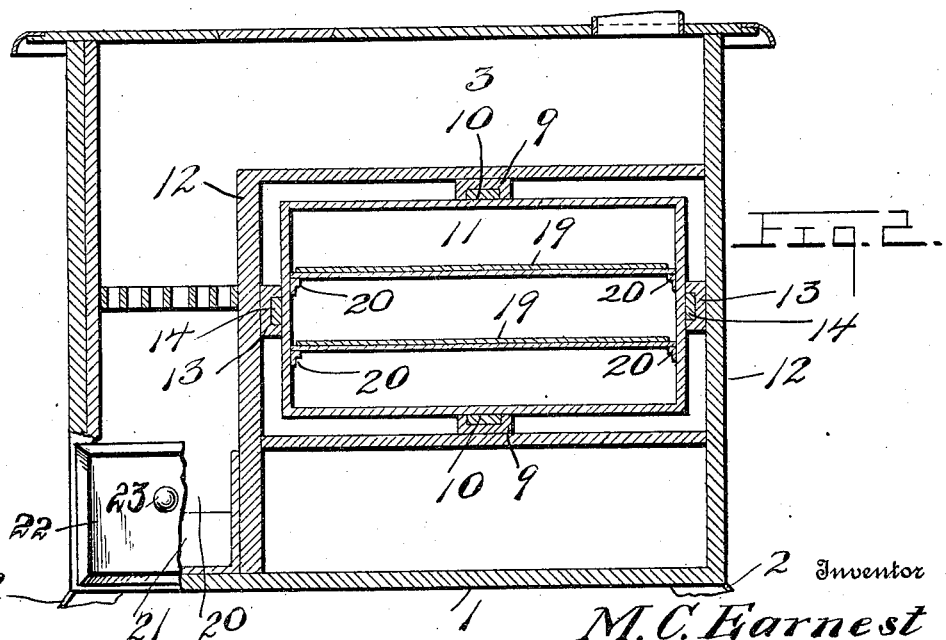
Witnesses
C. E. Johansen.
M. L. Lowv.
Inventor
M. C. Earnest
By Harry E. Chandler
Attorney.

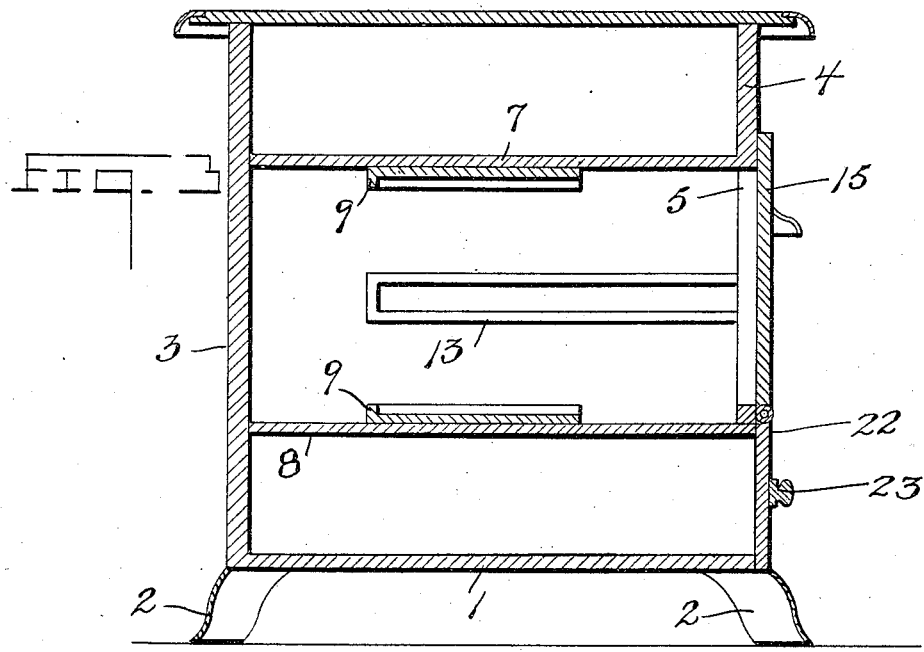
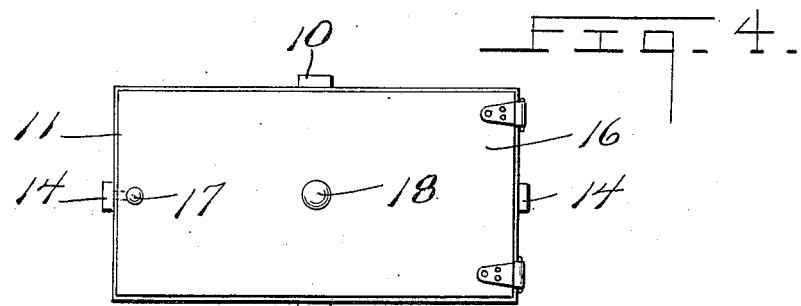
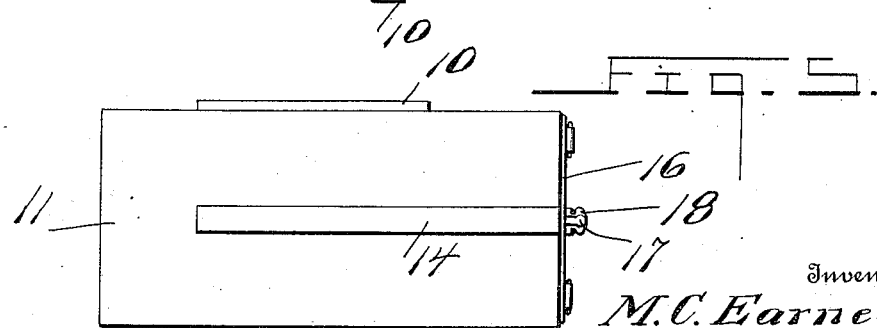

UNITED STATES PATENT OFFICE.

METTIE C. EARNEST, OF ELDORADO, TEXAS.

COOKING-STOVE.

1,046,059.

Specification of Letters Patent. Patented Dec. 3, 1912.

Application filed December 22, 1910. Serial No. 598,871.

*To all whom it may concern:*

Be it known that I, METTIE C. EARNEST, a citizen of the United States, residing at Eldorado, in the county of Schleicher and State of Texas, have invented certain new and useful Improvements in Cooking-Stoves, of which the following is a specification.

This invention relates to improvements in stoves and has particular reference to a removable oven, whereby when an oven burns out, all that is necessary is to replace it with a new one, instead of tearing the stove apart as is the case in the ordinary construction of stoves.

Other objects and advantages will be apparent from the following description, and with reference to the accompanying drawings forming a part of this specification and in which, Figure 1 is a vertical transverse section through a cooking stove showing my oven in position, Fig. 2 is a vertical longitudinal section through the same, Fig. 3 is a section similar to Fig. 1 with the oven removed, Fig. 4 is a front elevation of the oven removed, Fig. 5 is a side elevation of the same.

In the drawings, 1 represents the bottom of a cooking stove having the usual supporting legs 2.

3 represents the rear wall of the body of the stove and 4 the front wall thereof. In the front wall is formed a rectangular opening 5 through which my oven is inserted. A space 6 is formed between the front and rear walls of the body and is adapted to receive my removable oven 11. In the upper and lower walls 7 and 8 of the space 6 are formed the guide-ways 9, which are adapted to receive the projections 10 formed respectively on the upper and lower walls of the oven 11, and on the side walls 12 of the above mentioned space are formed similar guide-ways 13, to receive slidably therein, the projections 14 on the side walls of the oven 11. A suitable door 15 is hingedly connected to the front wall 4 below the opening 5 to gain access to the oven. The oven 11 is also provided with a hingedly connected door 16 having a suitable catch 17 at one end. A knob or handle 18 is arranged in the center of the door, by means of which the oven may be pulled from within the space 6, when it is desired to replace the same with a new one. The oven is provided with the usual shelves 19 slidably mounted on the guides 20.

It will thus be seen that when the oven 11 becomes burnt out and useless, it is only necessary to slide the oven from the space 6, and place a new one therein, thus obviating the old process of taking the stove apart to put a new lining to the oven. The oven constituting the subject matter of the present invention can be sold at a price greatly less than what it would cost to repair a stove of the ordinary construction.

At one side of the oven is formed the usual ash-pit 24 in which is adapted to be removably inserted an ash pan 21 having a flange 22 to prevent the same going in too far and a handle 23 by means of which the same is inserted or removed.

It will be apparent that changes in the form, proportions and minor details of construction may be resorted to without departing from the spirit or sacrificing any of the advantages of this invention.

What is claimed is:

A cooking stove having an oven space formed therein, channel members on the top, bottom and side walls of said space, a door for closing said space, the channel-members having stop walls on their inner ends, a removable oven having guiding ribs formed on the top, bottom and side walls and exteriorly thereof, said ribs adapted for slidable engagement within the channel members, a door hingedly mounted on said oven, a catch on said oven door, and a handle on the door for removing the oven from said oven space.

In testimony whereof I affix my signature, in the presence of two witnesses.

METTIE C. EARNEST.

Witnesses:
W. B. SILLIMAN,
F. PARMER.

---

Copies of this patent may be obtained for five cents each, by addressing the "Commissioner of Patents, Washington, D. C."